United States Patent
Kim et al.

(10) Patent No.: US 12,399,355 B2
(45) Date of Patent: Aug. 26, 2025

(54) 3D OPTICAL MICROSCOPE DEVICE OF SMALL FORM FACTOR OPTICAL SYSTEM

(71) Applicant: ELECTRONICS AND TELECOMMUNICATIONS RESEARCH INSTITUTE, Daejeon (KR)

(72) Inventors: Hyun Eui Kim, Daejeon (KR); Byung Gyu Chae, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 510 days.

(21) Appl. No.: 17/980,836

(22) Filed: Nov. 4, 2022

(65) Prior Publication Data

US 2023/0144036 A1 May 11, 2023

(30) Foreign Application Priority Data

Nov. 5, 2021 (KR) .......................... 10-2021-0151512
Oct. 13, 2022 (KR) .......................... 10-2022-0131659

(51) Int. Cl.
| | | |
|---|---|---|
| G02B 21/36 | (2006.01) | |
| G02B 21/00 | (2006.01) | |
| G02B 21/08 | (2006.01) | |
| G03H 1/00 | (2006.01) | |
| G03H 1/04 | (2006.01) | |
| G03H 1/16 | (2006.01) | |

(52) U.S. Cl.
CPC ..... *G02B 21/0032* (2013.01); *G02B 21/0028* (2013.01); *G02B 21/0048* (2013.01); *G02B 21/086* (2013.01); *G02B 21/361* (2013.01); *G03H 1/0005* (2013.01); *G03H 1/0443* (2013.01); *G03H 1/16* (2013.01); *G03H 2001/005* (2013.01); *G03H 2210/55* (2013.01); *G03H 2222/45* (2013.01)

(58) Field of Classification Search
CPC ............ G02B 21/0032; G02B 21/0028; G02B 21/0048; G02B 21/086; G02B 21/361; G03H 1/0005; G03H 1/0443; G03H 1/16
See application file for complete search history.

(56) References Cited

U.S. PATENT DOCUMENTS 4,033,665 A * 7/1977 Firester .................... G03H 1/16
359/29
2009/0278117 A1 11/2009 Lim et al.
2010/0048002 A1 2/2010 Kim et al.

FOREIGN PATENT DOCUMENTS

| EP | 3 722 861 | 10/2020 |
|---|---|---|
| JP | 6900066 | 7/2021 |
| KR | 10-0924574 | 10/2009 |

(Continued)

*Primary Examiner* — James A Dudek
(74) *Attorney, Agent, or Firm* — KILE PARK REED & HOUTTEMAN PLLC (57) ABSTRACT

A 3D optical microscope device of a small form factor optical system is disclosed. A transmission optical system device comprises a first lens having a left side disposed in contact with an input plane, and a second lens having a right side disposed in contact with a rear focal plane and disposed at a position spaced apart by a focal length of the first lens. The first lens and the second lens Fourier-transform a light signal incident on the input plane and output the transformed signal to the rear focal plane.

20 Claims, 7 Drawing Sheets

(56) References Cited

FOREIGN PATENT DOCUMENTS

| KR | 10-2018-0055994 | 5/2018 |
| KR | 10-2074279 | 2/2020 |

* cited by examiner

3D OPTICAL MICROSCOPE DEVICE OF SMALL FORM FACTOR OPTICAL SYSTEM

CROSS REFERENCE TO RELATED APPLICATION

The present application claims priority to Korean Patent Applications Nos. 10-2021-0151512, filed Nov. 5, 2021, and 10-2022-0131659, filed Oct. 13, 2022, the entire contents of which is incorporated herein for all purposes by this reference.

BACKGROUND OF THE INVENTION

1. Field of the Invention

The present disclosure relates to a 3D optical microscope device, and more particularly, to a 3D optical microscope device of a small form factor optical system.

2. Description of the Related Art

A three-dimensional optical microscope is a technology for reconstructing an image of a sample measured from multiple angles into a three-dimensional image. Since it has non-invasive properties that can measure biological specimens without staining, it is mainly used in biomedical applications. The optical system for this includes an optical scanning optical system that irradiates light waves to the specimen at various angles in order to acquire information on the specimen from various angles and an imaging optical system that transmits optical information generated from the specimen and photographs it through a camera sensor. A transmission optical system that magnifies or reduces light waves at an arbitrary magnification and transmits them is commonly applied to these optical systems. Specifically, in the optical scanning optical system, since there is a limit to the angle at which the optical scanner may deflect an incident light wave, a transmission optical system configuration that expands the deflection angle by reducing the input wavefront is required. In the imaging optical system, it is necessary to construct a transmission optical system that magnifies and transmits optical information generated from a very fine specimen to a resolution able to be obtained through the camera sensor.

SUMMARY OF THE INVENTION

An object of the present disclosure is to provide a 3D optical microscope device of a small form factor optical system.

Other objects and advantages of the present invention will become apparent from the description below and will be clearly understood through embodiments. In addition, it will be easily understood that the objects and advantages of the present disclosure may be realized by means of the appended claims and a combination thereof.

Disclosed herein a 3D optical microscope device of a small form factor optical system. According to an embodiment of the present disclosure, there is provided a A transmission optical system device comprising: a first lens having a left side disposed in contact with an input plane; and a second lens disposed at a position spaced apart by a focal length of the first lens and having a right side located in contact with a first output plane, wherein the first lens and the second lens have the same focal length, and Fourier-transform a light signal incident on the input plane and output the transformed signal to the first output plane.

According to the embodiment of the present disclosure, the transmission optical system device further comprising: a third lens having a left side disposed in contact with the first output plane; and a fourth lens disposed at a position spaced apart by a focal length of the third lens and having a right side located in contact with at a second output plane, wherein the third lens and the fourth lens have the same focal length, and Fourier-transform a light signal incident on the third lens and output the transformed signal to the second output plane.

According to the embodiment of the present disclosure, wherein a magnification M for transmitting a light wave of the input plane of the first lens to the second output plane of the fourth lens is determined to be fb/fa set by a focal length fb of the third lens or the fourth lens to a focal length fa of the first lens or the second lens.

According to the embodiment of the present disclosure, the transmission optical system device further comprising a fifth lens disposed at a position of the second lens by replacing the second lens and the third lens and having a focal length of $f_a \times f_b/(f_a+f_b)$.

According to the embodiment of the present disclosure, the transmission optical system device further comprising a sixth lens having a focal length $f_6$, wherein the sixth lens has a front focal plane on a rear output plane in contact with a right side of the second lens and Fourier-transforms a light signal and outputs the transformed signal to a rear output plane.

According to the embodiment of the present disclosure, wherein a magnification M for transmitting a light wave of the input plane of the first lens to a rear focal plane of the sixth lens is determined to be $f_6/f_a$ set by the focal length $f_6$ of the sixth lens to the focal length $f_a$ of the first lens.

According to the embodiment of the present disclosure, the transmission optical system device further comprising a seventh lens having a focal length $f_7$, wherein the seventh lens has a front focal plane located at a second input plane and a rear focal plane located at a left side of the first lens, Fourier-transforms a light signal and outputs the transformed signal to the input plane.

According to the embodiment of the present disclosure, wherein a magnification M for transmitting a light wave of the second input plane to the first output plane of the second lens is determined to be $f_a/f_7$ set by the focal length $f_7$ of the seventh lens to the focal length $f_a$ of the first lens.

According to the embodiment of the present disclosure, wherein the input plane corresponds to a beam deflection plane of an optical scanner.

According to the embodiment of the present disclosure, wherein the second input plane corresponds to a beam deflection plane of an optical scanner.

According to the embodiment of the present disclosure, wherein the second output plane corresponds to an input plane of an image sensor.

According to the embodiment of the present disclosure, wherein a rear focal plane of the sixth lens corresponds to an input plane of an image sensor.

According to the embodiment of the present disclosure, wherein the first output plane corresponds to an input plane of an image sensor.

According to another embodiment of the present disclosure, there is provided an optical microscope device comprising: an image sensor configured to sense an image of a specimen; and a transmission optical system device, wherein the transmission optical system device comprises: a first lens having a front focal plane located on the specimen, and first Fourier-transforming a light signal and outputting the transformed signal to a rear focal plane; a second lens having a left side disposed in contact with a first output plane corresponding to the rear focal plane; and a third lens disposed at a position spaced apart by a focal length of the second lens and having a right side located in contact with a second output plane, wherein the second lens and the third lens have the same focal length, and second Fourier-transform a light signal incident on the second lens and output the transformed signal to the second output plane.

According to another embodiment of the present disclosure, there is provided a tomographic holographic optical microscope device comprising: a beam splitter configured to split a light signal of a point light source; and a transmission optical system device, wherein the transmission optical system device comprises: a first lens having a front focal plane located on a specimen, and first Fourier-transforming a light signal and outputting the transformed signal to a rear focal plane; a second lens having a left side disposed in contact with a first output plane corresponding to the rear focal plane; and a third lens disposed at a position spaced apart by a focal length of the second lens and having a right side located in contact with a second output plane, wherein the second lens and the third lens have the same focal length, second Fourier-transform a light signal incident on the second lens and output the transformed signal to the second output plane, and generate a reference light by arranging a light signal of the point light source on a front focal plane of the third lens in contact with an optical sensor of an imaging optical device using the beam splitter.

The features briefly summarized above with respect to the present disclosure are merely exemplary aspects of the detailed description below of the present disclosure, and do not limit the scope of the present disclosure.

According to the present disclosure, it is possible to provide a 3D optical microscope device of a small form factor optical system.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

In the present document, such phrases as 'A or B', 'at least one of A and B', 'at least one of A or B', B or C', 'at least one of A, B and C' and 'at least one of A, B or C' may respectively include any one of items listed together in a corresponding phrase among those phrases or any possible combination thereof.

A three-dimensional optical microscope reconstructs an image of a specimen measured from multiple angles into a single three-dimensional image. Therefore, it is important to construct an optical scanning optical system that irradiates light waves at different angles to the specimen to obtain an image obtained by photographing the specimen at various angles and an imaging optical system that magnifies the specimen and photographs it through a camera. The optical scanning optical system is composed of an optical scanner that deflects incident light in detail, and a transmission optical system including a tube lens and condenser lens that irradiate a specimen by extending a limited deflection angle of the optical scanner.

Figure 1:
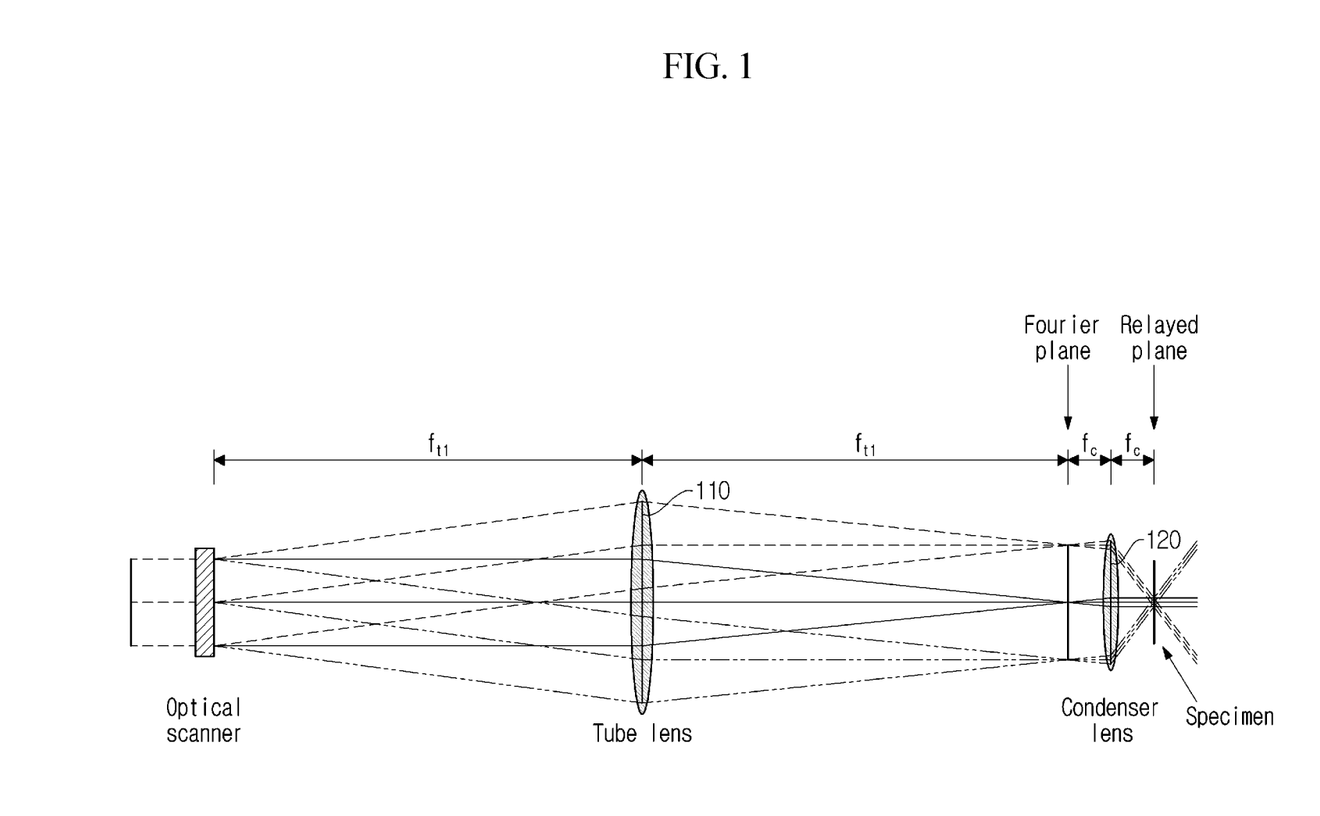
FIG. 1 illustrates the concept of an optical structure of an optical scanning optical system based on a conventional 4-f transmission optical system.
Figure 2:
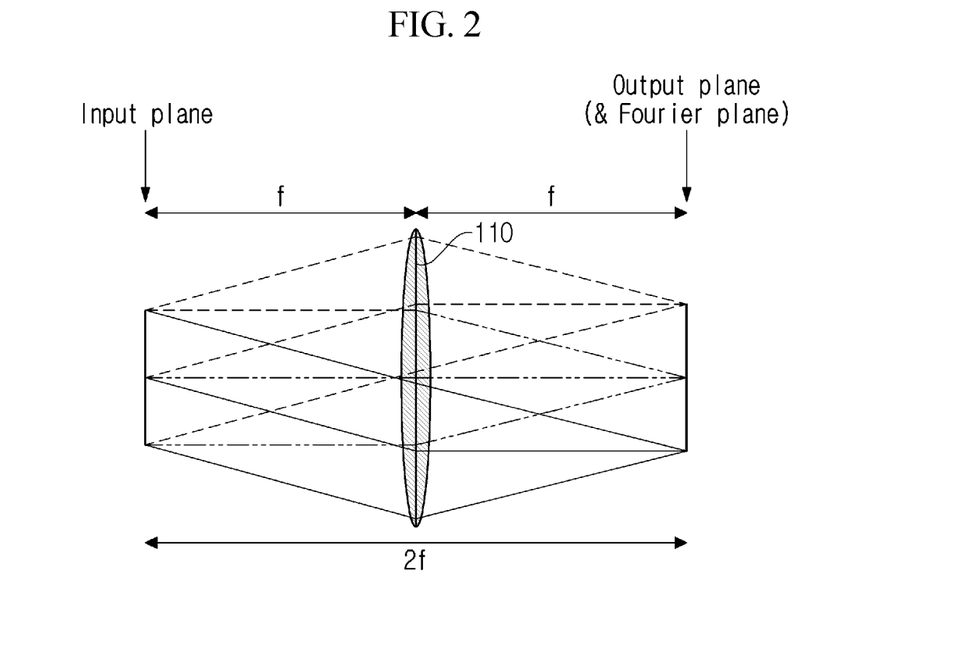
FIG. 2 illustrates a Fourier transform function of a single lens in a 4-F transmission optical system.

FIG. 1 illustrates the concept of an optical structure of an optical scanning optical system based on a conventional 4-f transmission optical system, and FIG. 2 illustrates a Fourier transform function of a single lens in a 4-F transmission optical system.

As shown in FIGS. 1 and 2, each lens configuring the 4-f transmission optical system is based on a structure which outputs a Fourier-transformed light signal to a front focal plane (output plane) by placing an input plane on a rear focal plane (output plane).

In this case, the 4-f transmission optical system may output a light signal in a structure which repeatedly performs Fourier transform, as shown in FIG. 2.

In the optical scanning optical system based on the 4-f transmission optical system, an optical scanner is placed on the rear focal plane (output plane) of a tube lens, and a condenser lens 120 is placed at a distance spaced apart from the tube lens 110 by a sum $f_{t1}+f_c$ of the focal lengths of the tube lens 110 and the condenser lens 120. As such, the total optical path length of the transmission optical system configured through the 4-f transmission optical system, that is, the distance between the optical scanner and the specimen is $2\times(f_{t1}+f_c)$. The light wave input without initial deflection is primarily deflected by a certain angle, for example, $\theta_{ci}$ by the optical scanner, and then magnified to an angle of $\theta_{co}=\theta_{ci}\times(1/M_c)$ by a magnification $M_c=f_c/f_{t1}$ of the transmission optical system and output, such that light waves of various angles are incident on the specimen disposed on the front focal plane (output plane) of the condensing lens 120.

In embodiments of the present disclosure, an optical microscope of a small form factor is implemented by performing an existing 4-f transmission optical system function in a shorter optical path.

Figure 3:
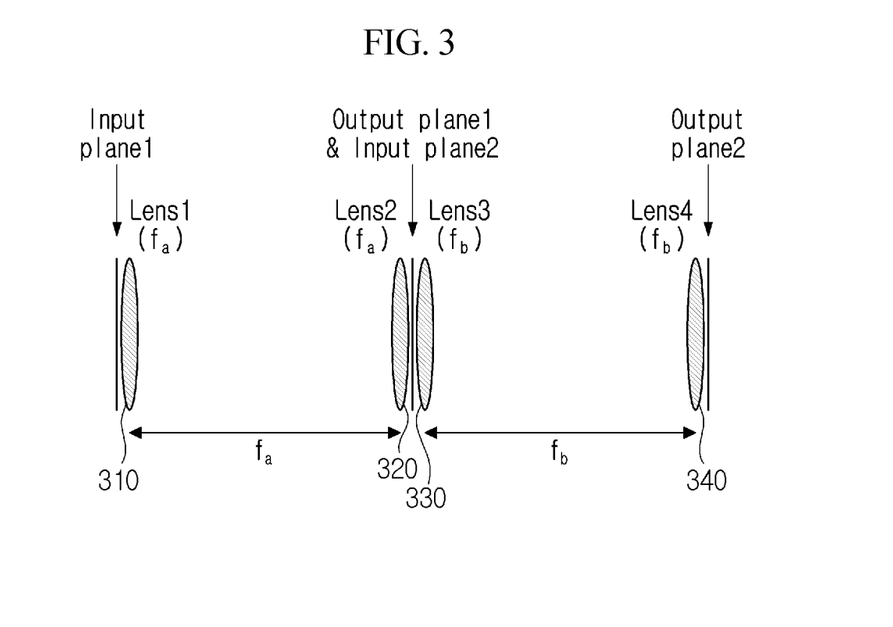
FIG. 3 illustrates the concept of a transmission optical system structure according to an embodiment of the present disclosure.
Figure 4:
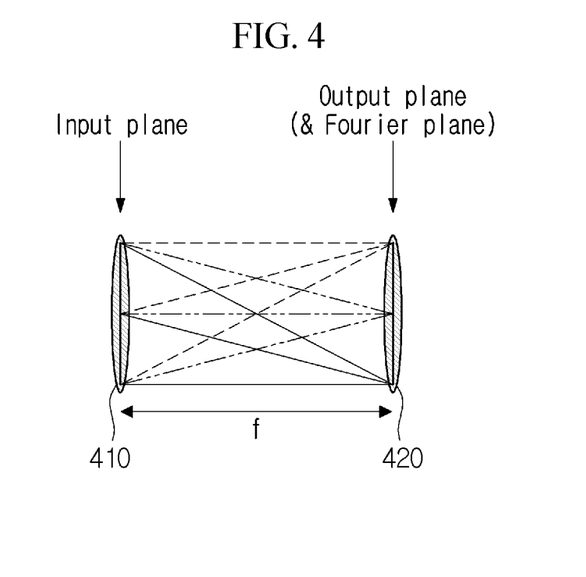
FIG. 4 illustrates a Fourier transform optical structure applied to the transmission optical system of FIG. 3.

FIG. 3 illustrates the concept of a transmission optical system structure according to an embodiment of the present disclosure, and FIG. 4 illustrates a Fourier transform optical structure applied to the transmission optical system of FIG. 3.

Referring to FIGS. 3 and 4, the transmission optical system structure according to an embodiment of the present disclosure is characterized in that the Fourier transform function performed by a single lens constituting the 4-f transmission optical system of FIG. 1 is performed using a pair of lenses 410 and 420 having the same focal length, as shown in FIG. 4.

In the structure of FIG. 4, an input plane is located in contact with the left side of a first lens 410, and a rear focal plane (output plane), which is a Fourier plane, is located in contact with the right side of a second lens 420 spaced apart by a focal length f of the two lenses 410 and 420. In the structure of FIG. 3, since Lens 2 320 and Lens 3 330 are ideally disposed without being physically spaced apart, they may be combined to form a single lens 520 as shown in FIG. 5, and the focal length $f_u$ of the single lens 520 may be equal to $f_a\times f_b/(f_a+f_b)$.

According to an embodiment, as shown in FIG. 4, the transmission optical system structure may have a structure in which Fourier transform is performed twice using two pairs of lenses 310, 320, 330 and 340, the light wave or light signal of the input plane 1 is Fourier-transformed using a pair of Lens 1 310 and Lens 2 320 having the same focal length fa and is output to the rear focal plane (output plane) of Lens 2 320 and light wave or light signal of the input plane 2 is Fourier-transformed using a pair of Lens 3 330 and Lens 4 340 having the same focal length fb and is output to the rear focal plane (output plane2) of Lens 4 340. Here, in the transmission optical system structure of FIG. 4, the optical path length of in the conventional 4-f transmission optical system structure may be reduced to $f_a+f_b$.

Figure 5:
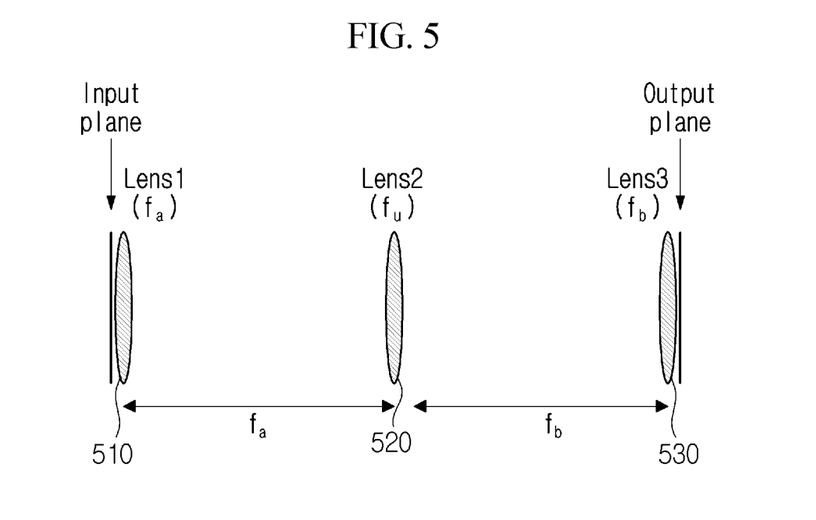
FIG. 5 illustrates the concept of a structure of a transmission optical system according to another embodiment of the present disclosure.

According to an embodiment, as shown in FIG. 5, in the transmission optical system structure, Lens 2 and Lens 3 of FIG. 3 may be configured as one single lens. That is, in the transmission optical system structure of FIG. 5, the left side of Lens 1 510 having a focal length of $f_a$ is disposed on the input plane, Lens 2 520 is disposed at a position spaced apart by the focal length $f_a$ of Lens 1 510, and Lens 3 530 is disposed at a position spaced apart from Lens 2 520 by a predetermined focal length (e.g., the focal length of the lens 3) $f_b$. Here, In the transmission optical system structure, Fourier transform is performed by Lens 1 510 and Lens 2 520, and Fourier transform is performed by Lens 2 520 and Lens 3 530, and, in Lens 2 520, the Fourier plane for first Fourier transform or the rear focal plane and the input plane for second Fourier transform may be the same. In addition, the focal length $f_u$ of Lens 2 520 may be equal to $f_a\times f_b/(f_a+f_b)$.

According to an embodiment, if the 4-f-based transmission optical system of FIG. 1 is configured with the transmission optical system according to the embodiment of the present disclosure shown in FIG. 3, each pair of lenses used in FIG. 1 is required for the optical system configuration. When the system is established through this, the light wave output through the structure of FIG. 3 is output by magnifying the deflection angle of the input light wave at the same magnification as the 4-f-based transmission optical system of FIG. 1. In this case, the entire optical path length of the transmission optical system of FIG. 3, that is, a distance between the specimens in the optical scanner, becomes $f_{t1}+f_c$, which is half of the transmission optical system of FIG. 1. The transmission optical system shown in FIG. 5 may also have the same optical path length.

Figure 6:
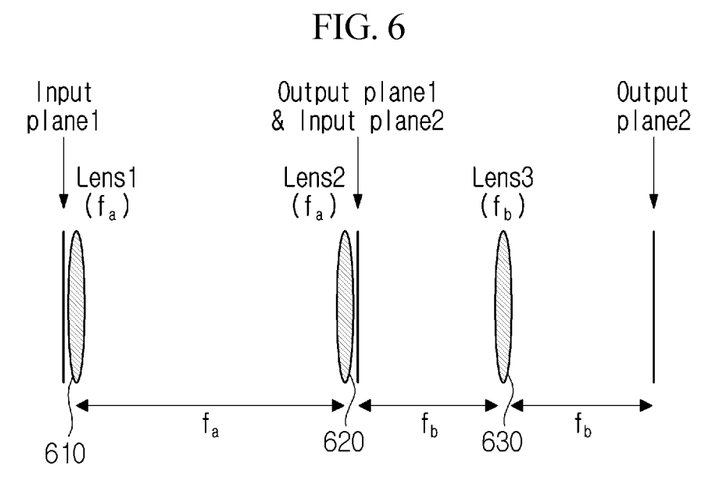
FIG. 6 illustrates the concept of a transmission optical system structure according to another embodiment of the present disclosure.
Figure 7:
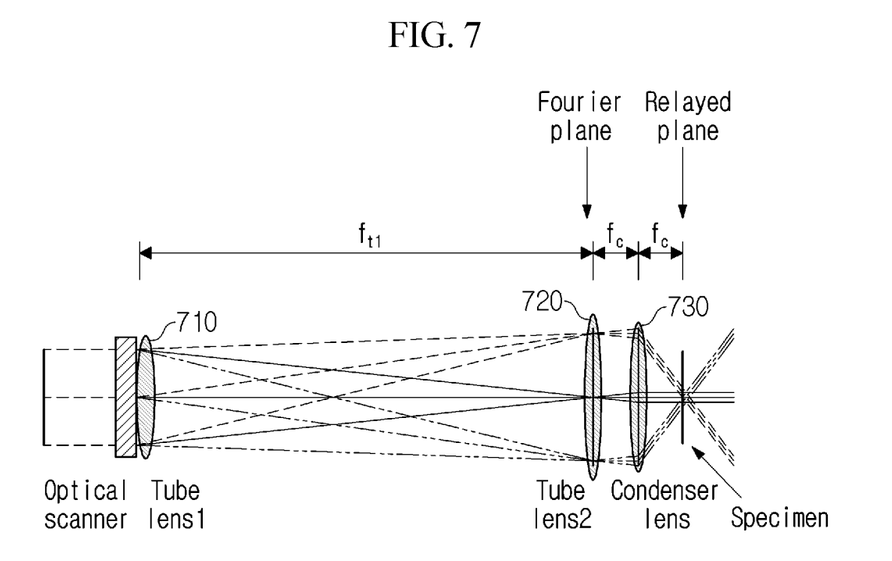
FIG. 7 illustrates an optical scanning optical system structure to which the optical concept of FIG. 6 is applied.

The optical magnification is determined by the focal length ratio of the two lenses constituting the transmission optical system. In general, in the case of the optical scanning optical system of a microscope, the magnification of the angle is tens to hundreds of times depending on the limited angular deflection performance of the optical scanner. The focal length of the tube lens is tens to hundreds of times the focal length of the condenser lens. Therefore, since the tube lens has a high influence on determining the total optical path length of the optical scanning optical system, it is possible to shorten the optical path by applying the Fourier transform structure shown in FIG. 4 only to the tube lens, and an optical conceptual diagram for this is shown in FIG. 6. FIG. 7 illustrates an optical scanning optical system structure to which the optical concept of FIG. 6 is applied. As illustrated in FIG. 7, by applying a Fourier transform structure only to the tube lens, an optical path may be shortened.

For example, as shown in FIG. 6, in the transmission optical system structure, a light wave or light signal of an input plane 1 is Fourier-transformed using a pair of Lens 1 610 and Lens 2 620 having the same focal length $f_a$ and is output to a rear focal plane (output plane) of Lens 2 620 and the structure illustrated in FIG. 2, that is, Lens 3 630 having a focal length fb is placed at an intermediate position between the rear focal plane (output plane2) of Lens 3 630 and the input plane 2, thereby performing second Fourier transform. That is, the transmission optical system structure of FIG. 6 is a structure in which the Fourier transform structure of FIG. 4 and the Fourier transform structure of FIG. 2 are combined. When the transmission optical system structure of FIG. 6 is applied to the optical scanning optical structure shown in FIG. 7, the left side of Tube lens 1 710 is disposed on the output plane of an optical scanner corresponding to the input plane, Tube lens 2 720 having the same focal length is disposed at a position spaced apart by the focal length ft1 of Tube lens 1 710, and the first Fourier transform is performed. A condenser lens 730 may be disposed at a position spaced apart from Tube lens 2 720 by a focal distance $f_c$ of the condenser lens 730 and second Fourier transform may be performed on the light signal or the light signal input to the specimen. In the transmission optical system structure of FIG. 7, the optical path length may be reduced because the focal length $f_c$ of the condenser lens 730 is smaller than the focal length $f_{t1}$ of the tube lens.

Figure 8:
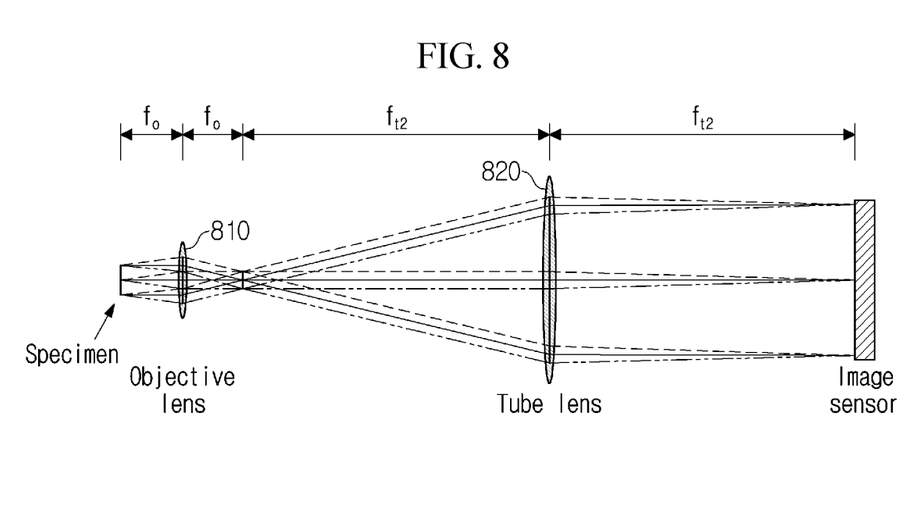
FIG. 8 illustrates a structure of a 4-f transmission optical system based microscope imaging optical system.
Figure 9:
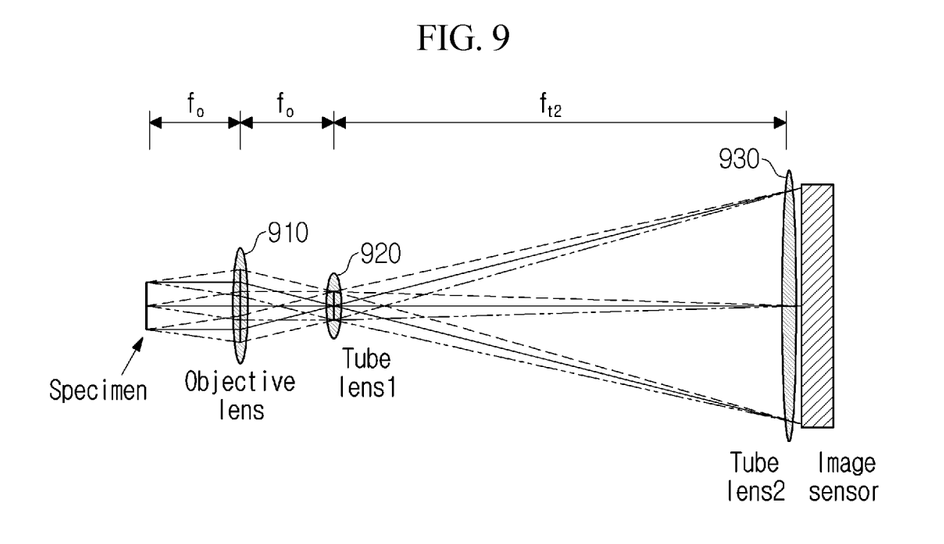
FIG. 9 illustrates a microscope imaging optical system structure to which the optical concept of FIG. 6 is applied.

The imaging optical system of the microscope is also based on a transmission optical structure. Accordingly, the transmission optical system structure according to the embodiment of the present disclosure for shortening the optical path applied to the optical scanning optical system is equally applied to the imaging optical system of the microscope. As shown in FIG. 8, the imaging optical system of the microscope has a structure in which an image obtained by magnifying a light wave transmitted from a specimen by a magnification $M_o = f_{t2}/f_o$ determined by a focal length $f_{t2}$ of a tube lens 820 and a focal length $f_o$ of an objective lens 810 is transmitted to a rear focal plane and a camera (image) sensor is disposed at the same position to take pictures. When the transmission optical system structure according to the embodiment of the present disclosure, for example, the transmission optical system structure of FIG. 6, is applied to the image optical system of the microscope, the image optical system structure of the microscope shown in FIG. 9 may be provided. As shown in FIG. 9, in the image optical system of the microscope, a first tube lens 920 and a second tube lens 930 are disposed at a position spaced apart by a focal length $f_{t2}$ and a Fourier transform structure illustrated in FIG. 4 is applied, thereby shortening an optical path from a specimen to an image sensor. Here, the second tube lens 930 may be placed adjacent to the input plane of the image sensor. That is, the light signal or light wave of the specimen is subjected to first Fourier transform using an objective lens 910 and is subjected to second Fourier transform through a pair of tube lens 920 and 920, thereby shortening an optical path from the specimen to the camera sensor.

Figure 10:
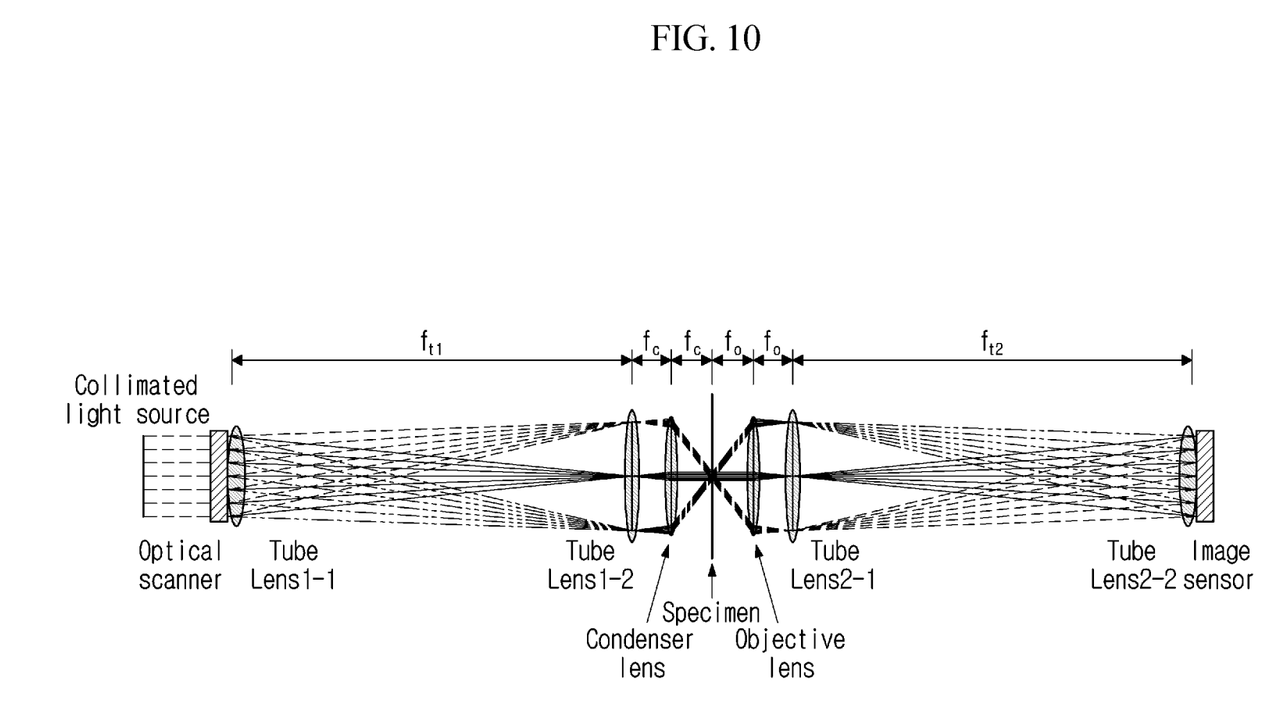
FIG. 10 illustrates an optical microscope device based on a transmission optical system structure of the present disclosure.

In addition, as shown in FIG. 10, by combining the optical scanning optical system structure of FIG. 7 and the imaging optical system structure of FIG. 9, an optical microscope system may be implemented. That is, the transmission optical system structure according to the embodiment of the present disclosure may be implemented between an optical scanner and a specimen and implemented between the specimen and the camera sensor, thereby implementing an optical microscope device. Of course, the transmission optical system structure shown in FIG. 9 may be applied to the optical microscope device including only a camera sensor, and, when an optical scanning optical system structure is included as in the 3D optical microscope device, the transmission optical system structure of the embodiments of the present disclosure may be applied to each optical system structure as shown in FIG. 10.

In this case, the transmission optical system structure applied to each of the optical scanning optical system structure and the imaging optical system structure may include not only the transmission optical system structure of FIG. 6 but also the transmission optical system structure of FIG. 3 and the transmission optical system structure of FIG. 5.

Figure 11:
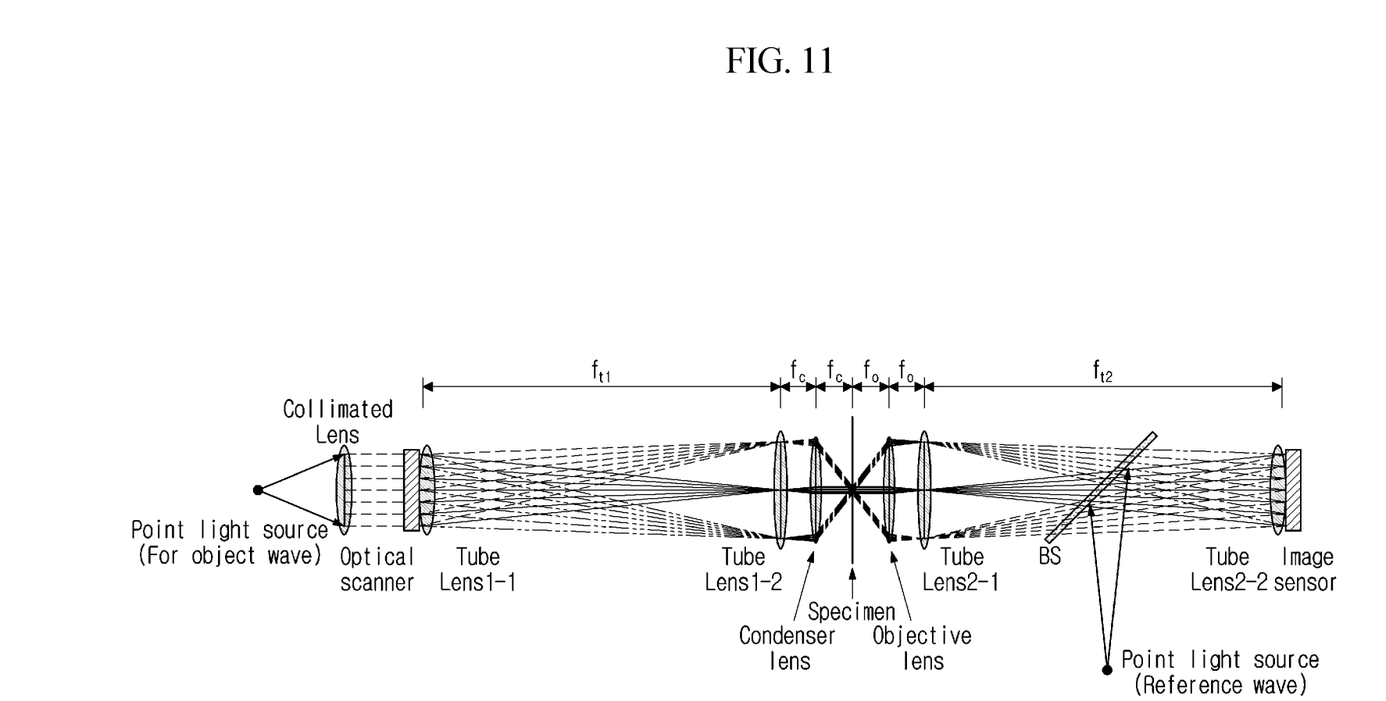
FIG. 11 illustrates a tomographic holographic optical microscope device based on a transmission optical system structure of the present disclosure.

Furthermore, the transmission optical system structure according to an embodiment of the present disclosure may be applied to other optical microscope structures. As an example, as shown in FIG. 11, the optical system of FIG. 10 may be applied to a tomographic holographic optical microscope device. The tomographic holographic optical microscope device requires the configuration of an optical scanning optical system that illuminates a coherent light source at various angles to acquire the complex field of the specimen in various angle directions, and an interferometer to acquire the complex field through interference. It is generally similar to the optical microscope structure of FIG. 10, but, because it is based on interference, a coherent light source is used, which is split to generate a reference wave and a signal wave through an optical system of each split part, which interfere in the image sensor of the imaging optical system through a beam splitter (BS), and a portion that generates an interference pattern is different.

In the optical structure illustrated in FIG. 11, an optical structure in which a coherent light source is split into two using a 1×2 optical fiber coupler and is output to a point light source. In this case, it may have a structure in which a point light source is disposed on a rear focal point of a tube lens 2-2 such that the reference wave incident on the image sensor is collimated in the form of a point light source but a planar wave by the tube lens 2-2. In this case, the point light source may be disposed in consideration of light reflected by a beam splitter.

Similarly, the transmission optical system structure applied to the tomographic holographic optical microscope device may include not only the transmission optical system structure of FIG. 6 but also the transmission optical system structure of FIG. 3 and the transmission optical system structure of FIG. 5.

Since the optical system of a general 3D optical microscope has an optical configuration based on a 4-f transmission optical system, the optical system optical path is lengthened in proportion to the transmission optical system magnification and has a long optical path, which results in large equipment. Accordingly, mobility of the microscope device is lowered, and its use is limited in the field where its use is essentially needed. For example, since the optical microscope has non-invasive properties, it is a device mainly used in biomedical applications, but the existing optical microscope has limitations in portability due to the large volume of the equipment and is limited in the field in which its use is essentially needed. In contrast, the transmission optical system structure according to the embodiments of the present disclosure reduces the optical path length and enables implementation of an optical microscope having a relatively small form factor. Therefore, it is valid for implementation of portable medical tools and devices which may be used in the field requiring an early and accurate diagnosis.

In addition, the transmission optical system structure according to the embodiment of the present disclosure is applied to all fields and products in which the transmission optical system structure may be used, such as an optical microscope device, a 3D optical microscope device, a tomographic hologram optical microscope device, etc., and the optical path length is reduced by the transmission optical system structure. Therefore, it is easy to downsize the product, and thus the portability function of the product may be improved.

The various embodiments of the present disclosure are not intended to list all possible combinations but are intended to illustrate representative aspects of the present disclosure, and the details described in various embodiments may be applied independently or in combination of two or more.

What is claimed is:

1. A transmission optical system device comprising:
   a first lens having a left side disposed in contact with an input plane; and
   a second lens disposed at a position spaced apart by a focal length of the first lens and having a right side located in contact with a first output plane,
   wherein the first lens and the second lens have the same focal length, and Fourier-transform a light signal incident on the input plane and output the transformed signal to the first output plane.

2. The transmission optical system device of claim 1, further comprising:
   a third lens having a left side disposed in contact with the first output plane; and
   a fourth lens disposed at a position spaced apart by a focal length of the third lens and having a right side located in contact with at a second output plane,
   wherein the third lens and the fourth lens have the same focal length, and Fourier-transform a light signal incident on the third lens and output the transformed signal to the second output plane.

3. The transmission optical system device of claim 2, wherein a magnification M for transmitting a light wave of the input plane of the first lens to the second output plane of the fourth lens is determined to be $f_b/f_a$ set by a focal length $f_b$ of the third lens or the fourth lens to a focal length $f_a$ of the first lens or the second lens.

4. The transmission optical system device of claim 3, further comprising a fifth lens disposed at a position of the second lens by replacing the second lens and the third lens and having a focal length of $f_a \times f_b/(f_a+f_b)$.

5. The transmission optical system device of claim 1, further comprising a sixth lens having a focal length $f_6$,
   wherein the sixth lens has a front focal plane on a rear output plane in contact with a right side of the second lens and Fourier-transforms a light signal and outputs the transformed signal to a rear output plane.

6. The transmission optical system device of claim 5, wherein a magnification M for transmitting a light wave of the input plane of the first lens to a rear focal plane of the sixth lens is determined to be $f_6/f_a$ set by the focal length $f_6$ of the sixth lens to the focal length $f_a$ of the first lens.

7. The transmission optical system device of claim 1, further comprising a seventh lens having a focal length $f_7$,
   wherein the seventh lens has a front focal plane located at a second input plane and a rear focal plane located at a left side of the first lens, Fourier-transforms a light signal and outputs the transformed signal to the input plane.

8. The transmission optical system device of claim 7, wherein a magnification M for transmitting a light wave of the second input plane to the first output plane of the second lens is determined to be $f_a/f_7$ set by the focal length $f_7$ of the seventh lens to the focal length $f_a$ of the first lens.

9. The transmission optical system device of claim 2, wherein the input plane corresponds to a beam deflection plane of an optical scanner.

10. The transmission optical system device of claim 4, wherein the input plane corresponds to a beam deflection plane of an optical scanner.

11. The transmission optical system device of claim 5, wherein the input plane corresponds to a beam deflection plane of an optical scanner.

12. The transmission optical system device of claim 7, wherein the second input plane corresponds to a beam deflection plane of an optical scanner.

13. The transmission optical system device of claim 2, wherein the second output plane corresponds to an input plane of an image sensor.

14. The transmission optical system device of claim 4, wherein the second output plane corresponds to an input plane of an image sensor.

15. The transmission optical system device of claim 5, wherein a rear focal plane of the sixth lens corresponds to an input plane of an image sensor.

16. The transmission optical system device of claim 7, wherein the first output plane corresponds to an input plane of an image sensor.

17. An optical microscope device comprising:
    an image sensor configured to sense an image of a specimen; and
    a transmission optical system device,
    wherein the transmission optical system device comprises:
    a first lens having a front focal plane located on the specimen, and first Fourier-transforming a light signal and outputting the transformed signal to a rear focal plane;
    a second lens having a left side disposed in contact with a first output plane corresponding to the rear focal plane; and
    a third lens disposed at a position spaced apart by a focal length of the second lens and having a right side located in contact with a second output plane,
    wherein the second lens and the third lens have the same focal length, and second Fourier-transform a light signal incident on the second lens and output the transformed signal to the second output plane.

18. The optical microscope device of claim 17, wherein the transformation optical system device further comprises:
    a fourth lens having a lest side disposed in contact with an input plane located on the specimen by replacing the first lens; and
    a fifth lens disposed at a position spaced apart by a focal length of the fourth lens and having a right side located in contact with at the first output plane.

19. The transmission optical system device of claim 18, comprising a sixth lens disposed at a position of the fifth lens by replacing the fifth lens and the second lens and having a focal length of $f_a \times f_b/(f_a+f_b)$ when the focal length of the second lens is $f_a$ and the focal length of the fifth lens is $f_b$.

20. A tomographic holographic optical microscope device comprising:
    a beam splitter configured to split a light signal of a point light source; and
    a transmission optical system device,
    wherein the transmission optical system device comprises:
    a first lens having a front focal plane located on a specimen, and first Fourier-transforming a light signal and outputting the transformed signal to a rear focal plane;

a second lens having a left side disposed in contact with a first output plane corresponding to the rear focal plane; and a third lens disposed at a position spaced apart by a focal length of the second lens and having a right side located in contact with a second output plane, wherein the second lens and the third lens:

have the same focal length, second Fourier-transform a light signal incident on the second lens and output the transformed signal to the second output plane, and generate a reference light by arranging a light signal of the point light source on a front focal plane of the third lens in contact with an optical sensor of an imaging optical device using the beam splitter.

* * * * *